United States Patent
Massen et al.

(10) Patent No.: US 7,689,334 B2
(45) Date of Patent: Mar. 30, 2010

(54) ENGINE DIAGNOSTIC METHOD

(75) Inventors: Anthony Keith Massen, Peterborough (GB); Oliver Michael James Lythgoe, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 770 days.

(21) Appl. No.: 11/540,523

(22) Filed: Sep. 28, 2006

(65) Prior Publication Data

US 2008/0082228 A1    Apr. 3, 2008

(51) Int. Cl.
*G01M 17/00*    (2006.01)
*G06F 19/00*    (2006.01)

(52) U.S. Cl. .............................. 701/29; 701/33; 701/35
(58) Field of Classification Search ................... 701/29, 701/30, 33, 35; 702/188
See application file for complete search history.

(56) References Cited

U.S. PATENT DOCUMENTS

| | | | |
|---|---|---|---|
| 4,375,672 A | 3/1983 | Kato et al. | |
| 4,602,127 A | 7/1986 | Neely et al. | |
| 5,056,026 A | 10/1991 | Mitchell et al. | |
| 6,321,151 B1 | 11/2001 | Shultz | |
| 6,330,499 B1 | 12/2001 | Chou et al. | |
| 6,339,736 B1 * | 1/2002 | Moskowitz et al. | 701/29 |
| 6,529,808 B1 * | 3/2003 | Diem | 701/29 |
| 6,615,186 B1 | 9/2003 | Kolls | |
| 6,654,673 B2 | 11/2003 | Ferguson et al. | |
| 6,745,151 B2 | 6/2004 | Marko et al. | |
| 6,895,310 B1 | 5/2005 | Kolls | |
| 6,925,468 B1 * | 8/2005 | Bobbitt et al. | 707/102 |
| 7,003,289 B1 | 2/2006 | Kolls | |
| 7,376,497 B2 * | 5/2008 | Chen | 701/29 |
| 2004/0167689 A1 * | 8/2004 | Bromley et al. | 701/29 |
| 2005/0060070 A1 | 3/2005 | Kapolka et al. | |
| 2005/0080593 A1 | 4/2005 | Blaser | |
| 2005/0251299 A1 | 11/2005 | Donnelly et al. | |
| 2005/0278213 A1 | 12/2005 | Faihe | |
| 2005/0287034 A1 | 12/2005 | Wills et al. | |
| 2006/0047382 A1 | 3/2006 | Morioka et al. | |
| 2006/0056959 A1 | 3/2006 | Sabol et al. | |
| 2006/0069473 A1 | 3/2006 | Sumcad et al. | |
| 2006/0161313 A1 * | 7/2006 | Rogers et al. | 701/1 |
| 2007/0010922 A1 * | 1/2007 | Buckley | 701/29 |

FOREIGN PATENT DOCUMENTS

| | | |
|---|---|---|
| JP | 11003113 | 1/1999 |
| WO | WO 99/36839 | 7/1999 |
| WO | WO 02/090918 A2 | 11/2002 |

* cited by examiner

*Primary Examiner*—Tan Q Nguyen
(74) *Attorney, Agent, or Firm*—Finnegan, Henderson, Farabow, Garrett & Dunner

(57) ABSTRACT

A method is provided for diagnosing an engine system. The method may include receiving a request for diagnosing an engine system, delivering a diagnostic module to the requester from a location remote from the engine system, and having the diagnostic module coupled to the engine system. The method may further include diagnosing the engine system based on information received by the diagnostic module, and providing repair assistance based on the diagnosing of the engine system.

20 Claims, 5 Drawing Sheets

ENGINE DIAGNOSTIC METHOD

TECHNICAL FIELD

The present disclosure relates generally to a diagnostic method, and more particularly, to a diagnostic method for an engine system.

BACKGROUND

Complex mechanical, electrical, and electromechanical systems including engine systems, electronic control systems, and other devices are mass-produced and in widespread use. Even though manufacturers generally make continuous improvements in reliability and durability of such systems, tendencies toward failures or degraded system performance over time cannot be totally eliminated. Therefore, system monitoring and diagnostic testing are often used to detect operational anomalies and their causes.

Diagnostic/monitoring functions have been used both within systems themselves and at special testing centers. In automobile systems, for example, a combination of on-board diagnostics and service center diagnostics are utilized to identify a problem and isolate its cause in order to guide repair or service procedures in an economical manner. On-board diagnostic systems, however, are limited in scope and capability by cost and hardware constraints. Diagnostics at a service center, on the other hand, are less constrained by cost or space but they require a vehicle be brought to a service center facility before either a fault can be identified or corrective actions (e.g., obtaining replacement parts) can be initiated.

One method of providing remote monitoring and diagnostics is described in U.S. Pat. No. 6,745,151 (the '151 patent) issued to Marko et al. The '151 patent describes a diagnostic system that monitors performance of a vehicle and its operational components. A data collection memory in the vehicle stores samples of diagnostic readings in a rolling buffer. An analyzer in the vehicle is responsive to the diagnostic readings and detects a trigger event indicative of an abnormal operating state of an operational component. A computation center located remotely from the vehicle has a database storing representations of diagnostic readings for classifying nominal and abnormal operating states of the operational components. A transmitter is activated by the trigger event to transmit at least some of the stored samples in the rolling buffer at the time of the trigger event to the computation center. The computation center receives the transmitted samples and classifies them according to the nominal or irregular operating states.

Although the system of the '151 patent may provide a remote monitoring and diagnosis for a vehicle, the disclosed system does not facilitate providing repair or service assistance based on the diagnostic information. The present invention is directed to overcoming one or more of the problems as set forth above.

SUMMARY OF THE INVENTION

In one aspect, the present disclosure is directed to a method of diagnosing an engine system. The method may include receiving a request for diagnosing an engine system, and delivering a diagnostic module to the requestor from a location remote from the engine system. The method may further include having the diagnostic module coupled to the engine system, diagnosing the engine system based on information received by the diagnostic module, and providing repair or service assistance based on the diagnosing of the engine system.

In another aspect, the method may include receiving a request for diagnosing an engine system, delivering a diagnostic module to the requester, and initiating the diagnosis of the engine. The initiating the diagnosis of the engine may include sensing at least one parameter of the engine system and generating data representing the sensed at least one parameter. The initiating the diagnosis of the engine may further include transmitting the data to the diagnostic module coupled to the engine system, and transmitting output data from the diagnostic module to a location remote from the engine system through a communication link. The method may further include diagnosing the engine system with the output data from the diagnostic module.

In yet another aspect, the method may include sending a request for diagnosing an engine system to a service provider. The method may further include receiving a diagnostic module from the service provider and electronically couple the diagnostic module to the engine system. The method may also include transmitting diagnostic data generated by the diagnostic module to the service provider. The method may further include receiving repair or service information from the service provider based on the transmitted diagnostic data.

DETAILED DESCRIPTION

Figure 1:
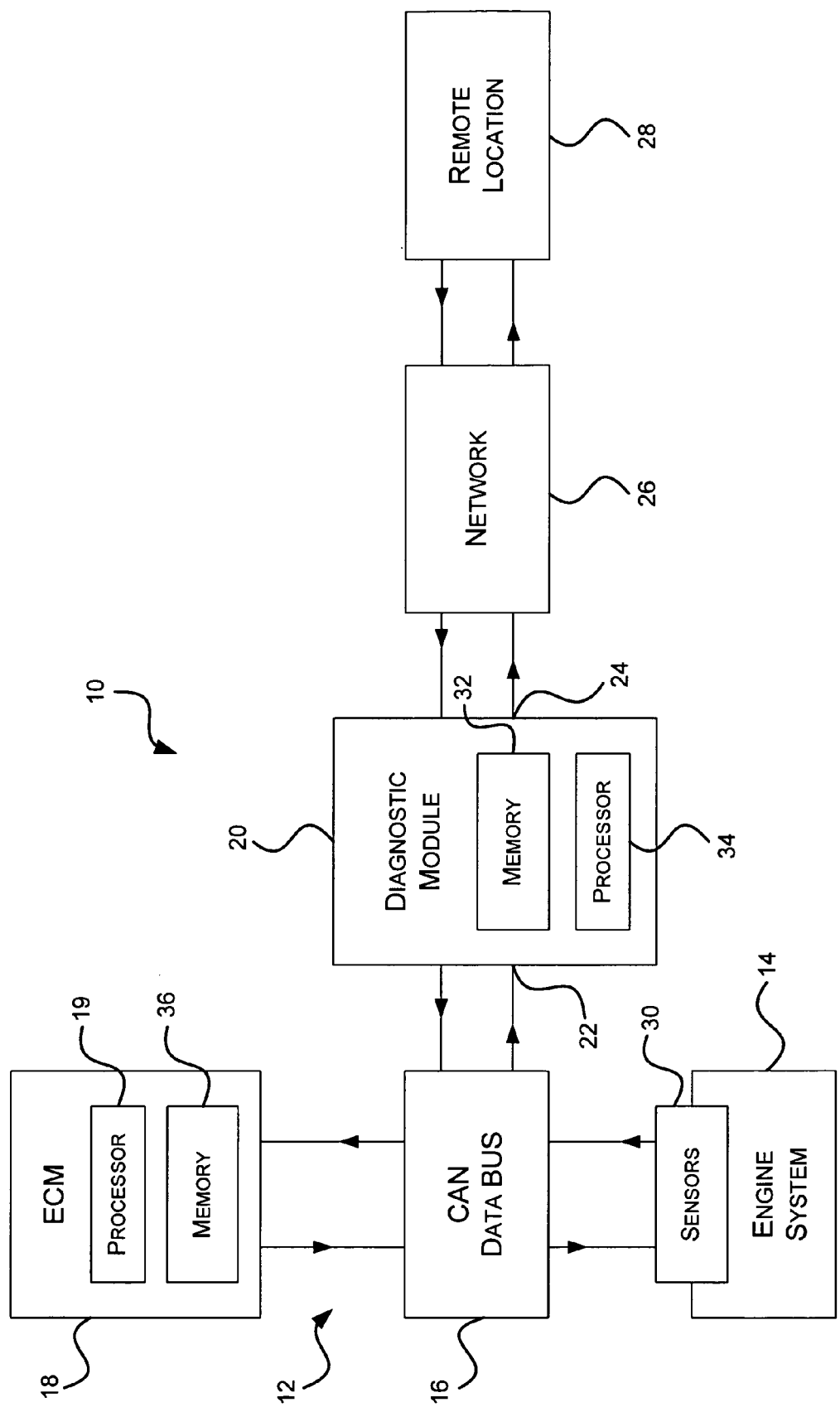
FIG. 1 is a schematic illustration of an exemplary disclosed diagnostic system according to one aspect of the disclosure.

FIG. 1 illustrates an exemplary diagnostic system 10 for diagnosing an engine system 14. The engine system 14 is representative of a wide variety of engine systems, for example, spark ignited engines, compression ignited engines, etc. The engine system 14 may have an intake system, a coolant system, an exhaust system, a transmission system, and other systems (not shown) constructed and operable in a conventional manner.

The engine system 14 may be used in a machine system 12. The machine system 12 may be any type of conventional stationary or mobile machine system, for example, automobiles, excavating or earth-moving equipment, etc.

As shown in FIG. 1, the machine system 12 may include a controller area network (CAN) data bus 16 and an electronic control module (ECM) 18. The CAN data bus 16 may provide connections between the engine system 14 and the ECM 18, allowing communication of control parameters and commands between the engine system 14 and the ECM 18. The communication between the engine system 14 and the ECM 18 may control the operation of the engine system 14. For example, ECM 18 may send signals to fuel injectors to modify injection timing. The specific communication protocol utilized by the CAN data bus 16 may be application specific. One exemplary protocol for heavy duty applications is the Society of Automotive Engineers standard J1939. The ECM 18 may be an electronic device that may include a processor 19 which reads information transmitted through the CAN data bus 16 from the engine system 14 and uses the information, as well as external commands such as commands from an operator of the machine to control operations of the engine system 14.

Figure 2:
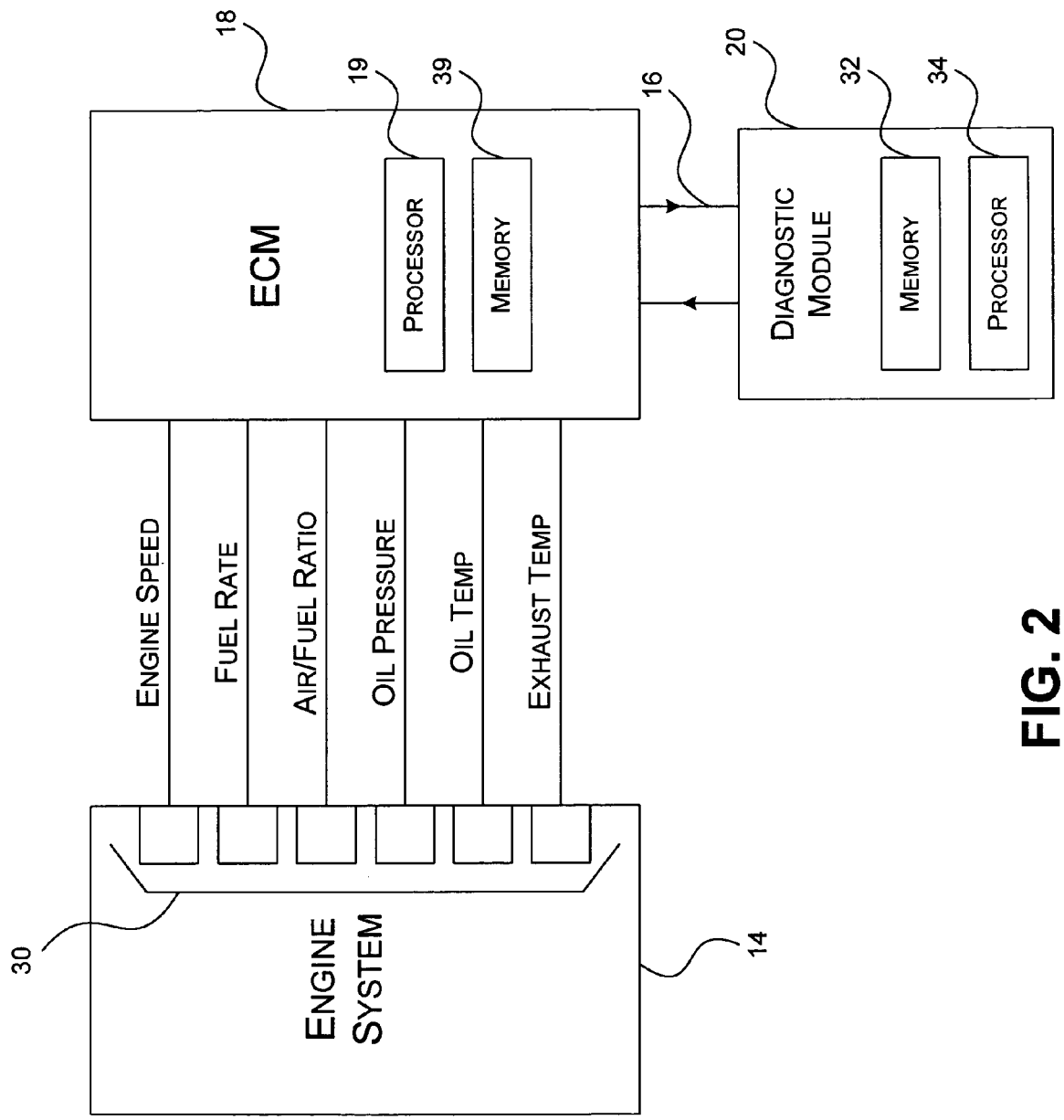
FIG. 2 is a schematic illustration of an exemplary disclosed diagnostic system according to another aspect of the disclosure.

As shown in more detail in FIG. 2, the engine system 14 may include a plurality of sensors 30 operable for sensing a variety of operating parameters of the engine system 14, including, but not limited to: engine speed, the rate of fuel delivery to the engine, the ratio of air to fuel delivery to the engine, the pressure of oil in the engine, the temperature of the oil, and the temperature of exhaust leaving the engine. The CAN data bus 16 may be connected to the sensors 30 in the engine system 14 for receiving signals generated by the sensors 30. The engine system 14 may further include a transmission system (not shown) and other systems (e.g., an intake system, a coolant system, and an exhaust system, etc.), and the CAN data bus 16 may be further coupled to sensors of the transmission system and other systems for collecting information on parameters of the transmission system and other systems (not shown).

Referring back to FIG. 1, a diagnostic module 20 may be communicatively connected to the CAN data bus 16 for receiving signals containing information representative of the above discussed sensed parameters. The diagnostic module 20 may be attachable to and/or removable from the machine system 12. The diagnostic module 20 may include an input 22 coupled to the CAN data bus 16 and an output 24 coupled to a communication link, for example, a network 26. The diagnostic module 20 may include a processor 34 capable of real-time processing of the above discussed signals received at the input 22 and generating an output message at the output 24 connected to the network 26. In one embodiment, the network 26 may be an intranet or the Internet. In another embodiment, the network 26 may be a wireless network, for example, a Global System for Mobile Communications (GSM) network. The diagnostic module 20 may include a modem connected to the network 26. The diagnostic module 20 may be connected through the network 26 to a system located at a remote location with respect to the machine system 12, for example, a remote location 28 a great distance away from the machine system 12. The output message from the diagnostic module 20 can be sent to the remote location 28 for diagnosing the engine system 14 through the network 26. The remote location 28 also can send testing signals or instructions through the network 26 to the diagnostic module 20.

The diagnostic module 20 may employ the following steps for diagnosing the engine system 14. First, a plurality of initial selected engine parameters under predetermined normal engine operating conditions may be determined. Then, during subsequent operation of the engine system 14, actual engine parameters may be sensed by the sensors 30 and transmitted to the diagnostic module 20 through the CAN data bus 16. These sensed actual engine parameter values may be provided as the output message at the output 24 of the diagnostic module 20. The output message may be received at the remote location 28 and the values enclosed in the output message may be compared with desired value ranges for the selected engine parameters. A difference between the sensed actual engine parameter values and the predetermined or modeled engine parameter values may be determined. The engine system 14 is then diagnosed using the comparison results.

Alternatively, the processor 34 of the diagnostic module 20 may itself process the sensed actual engine parameter values and the predetermined or modeled engine parameter values, and generate an initial diagnostic message at the output 24. The initial diagnostic message may be transmitted to the remote location 28 and may be further analyzed or confirmed at the remote location 28 for diagnosing the engine system 14.

Once the diagnostic module 20 is connected to the CAN data bus 16, the ECM 18 and the network 26, the diagnostic module 20 may have access to communication lines and/or data-logging system of the engine system 14. If the engine system 14 is equipped with a data logger for recording signals from the sensors 30, the diagnostic module 20 may be capable of downloading and recording the signals from the data logger. The diagnostic module 20 may be able to analyze the data itself or transmit the data obtained from the data logger to the remote location 28 for diagnosing the engine system 14.

In one embodiment, the diagnostic module 20 may be implemented with the CAN Calibration Protocol (CCP), which is a protocol for communicating between a target processor and a host machine over a CAN data bus. With the CCP capability, the diagnostic module 20 may be able to access ECM memory 36 and change the data in the ECM memory 36. For example, the ECM memory 36 may store engine configuration information, for example, engine speed, torque, timing, fueling, governor gains, etc. One example of engine configuration information may include engine fuel map configurations. The engine fuel map configurations may include information regarding revolutions per minute (rpm) of the engine and air density. The diagnostic module 20 may be programmed with the associated memory addresses in the ECM memory 36 and replacement values. Using the address information and the replacement values, the diagnostic module 20 may reconfigure or change the configuration information of the engine system 14 in the ECM memory 36. In one embodiment, the diagnostic module 20 may include a memory 32 for storing multiple engine configurations (e.g., fuel maps). The user may remotely instruct the diagnostic module 20 to reconfigure the ECM 18 with the engine configuration information stored in the memory 32 of the diagnostic module 20, switching the engine system 14 between different engine configurations, which may allow the user to test several configurations without assistance of an engineer to access the engine system 14 locally. In another embodiment, the diagnostic module 20 may be configured to obtain engine configuration information through the network 26, and use the engine configuration information obtained through the network 26 to change the engine configuration information stored in the ECM 18. The changing of the engine configuration may also be done automatically through the diagnostic module 20.

Figure 3:
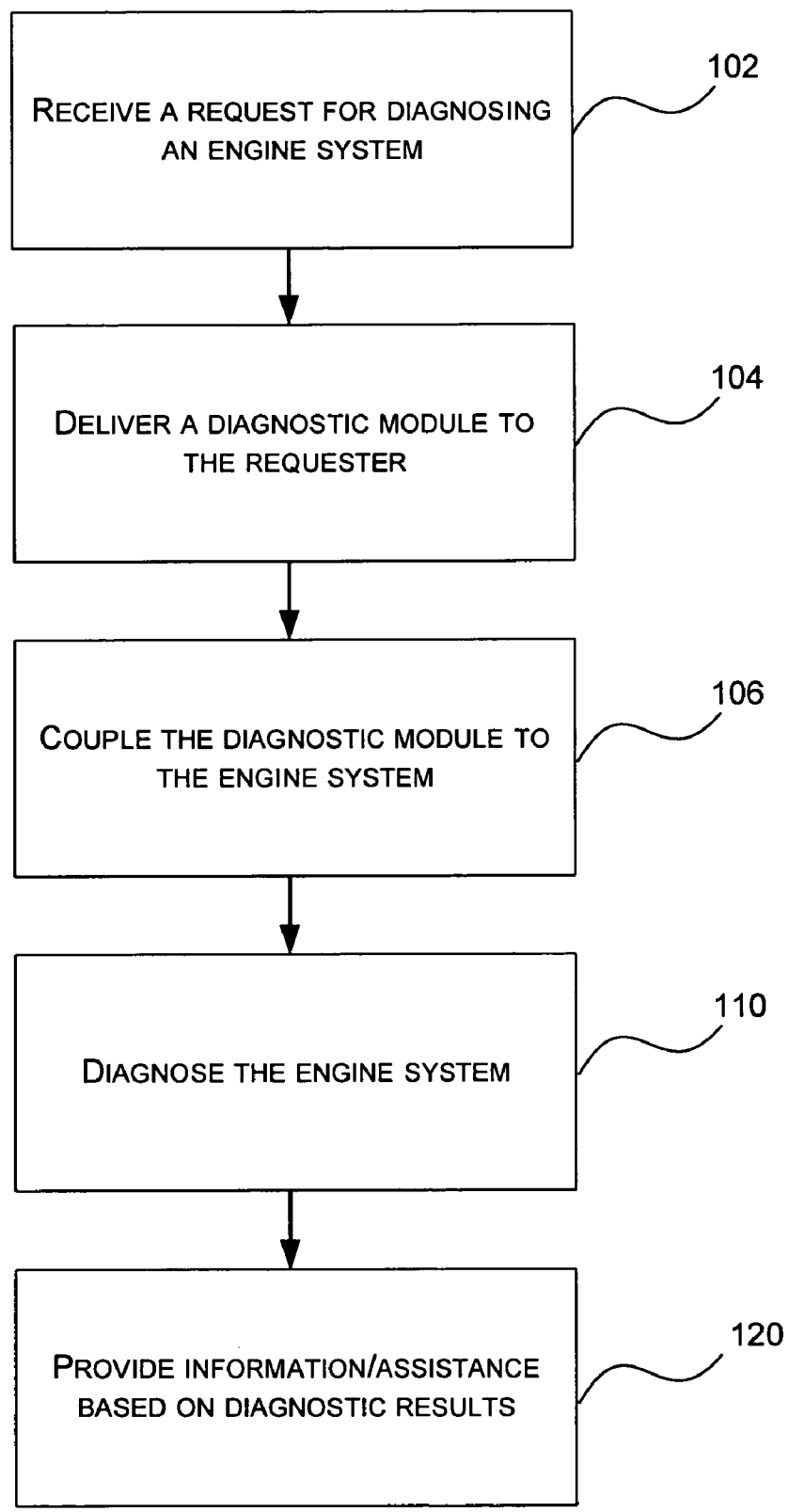
FIG. 3 is a flow chart illustrating a method for diagnosing an engine system according to one embodiment of the disclosure.

FIG. 3 shows a flow chart of an exemplary diagnostic method using the diagnostic system 10. At block 102, a manufacturer (or a service provider) may receive a request from a customer (or a user) for diagnosing engine system problems. At block 104, the manufacturer may deliver a diagnostic module 20 to the customer from a location remote from the engine system 14, for example, the diagnostic module 20 may be mailed to the customer from the manufacturer or the service provider. At block 106, the manufacturer may have the diagnostic module 20 coupled to the engine system 14. The manufacture may send an engineer who is skilled in coupling the diagnostic module 20 to the engine system 14 to the customer to couple the diagnostic module 20 to the engine system 14. The engineer who couples the diagnostic module typically may have lower-level of skills (relative to repairing the engine system) with lower cost. Alternatively, the manufacturer may send installation instructions to the customer and have the customer couple the diagnostic module 20.

As disclosed above, the diagnostic module 20 may be connected to the CAN data bus 16. The diagnostic module 20 may receive signals from sensors 30 and send signals to the manufacturer (remote location 28) for diagnosing the engine system 14. At block 110, the manufacturer may diagnose the engine system 14 with the diagnostic module 20 from the location 28 remote from the engine system 14. As noted above, however, the diagnostic module 20 may itself diagnose the engine without communicating with remote location 28.

At block 120, the manufacturer (or service provider) may repair the engine system 14 based on a diagnostic result of step 110. In one embodiment, the manufacturer may send instructions and/or parts for repairing the engine system 14 based on the diagnostic result of step 110 to the customer, and have the customer repair the engine system 14 based on the instructions. In another embodiment, the manufacturer may send an engineer that is skilled in solving the particular problem diagnosed in step 110 to the customer to repair the engine system 14. In yet another embodiment, the manufacture may selectively send an engineer having a particular level or type of skills based on a difficulty level or the type of problem diagnosed in step 110 to the customer to repair the engine system 14. For example, the diagnostic result from step 110 may show that the engine system 14 may have a problem in its transmission system, and the manufacturer may send an engineer specialized in solving that type of problem. Repairing the engine system may include rectifying a fault, correcting a failure, performing preventative maintenance, and/or other procedures to keep the engine system 14 in normal condition.

The diagnostic module 20 may be attached to a diagnostic connector on the engine system 14 or attached to a diagnostic connector that is discrete from the engine system 14. The diagnostic module 20 may be connected directly to the CAN data bus 16 via the machine harness anywhere on the machine system 12. The diagnostic connector may be wirelessly connected with the machine system 12.

Figure 4:
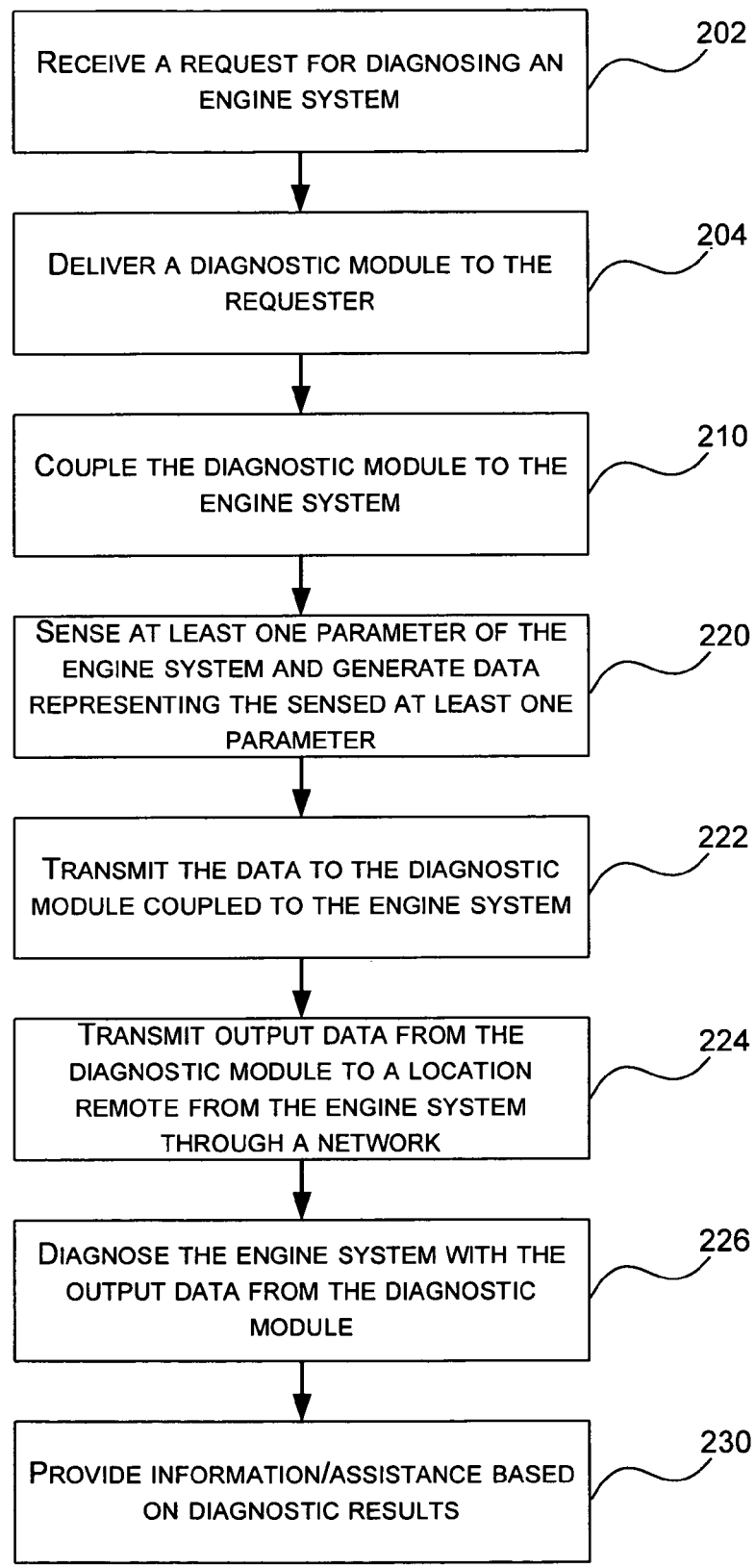
FIG. 4 is a flow chart illustrating a method for diagnosing an engine system according to another embodiment of the disclosure.

FIG. 4 illustrates a flow chart of another exemplary diagnostic method for diagnosing the engine system 14 using the diagnostic system 10. At block 202, the manufacturer (or service provider) may receive a request from a customer for diagnosing an engine system 14. At block 204, the manufacturer may deliver a diagnostic module 20 to the customer. At block 210, the diagnostic module 20 may be coupled to the engine system 14. In one embodiment, the manufacturer may send installation instructions to the customer and have the customer couple the diagnostic module 20 to the engine system 14. In another embodiment, the manufacturer may send an engineer to couple the diagnostic module 20 to the engine system 14. As disclosed above, the diagnostic module 20 may be coupled to sensors 30 on the engine system 14 through the CAN data bus 16.

At block 220, the sensors 30 may sense at least one parameter of the engine system 14 and generate data representing the sensed at least one parameter. At block 222, the sensors 30 may transmit the data to the diagnostic module 20 coupled to the engine system 14. At block 224, the diagnostic module 20 may transmit output data from the diagnostic module 20 to a remote location 28 (associated with the manufacturer or the service provider) through the network 26. At block 226, the manufacturer may diagnose the engine system 14 with the output data from the diagnostic module 20. The diagnostic module 20 may send sensed data or processed data. In one embodiment, the diagnostic module 20 may change the engine configuration information in the electronic control module 18 of the engine system 14 with new engine configuration information. The new engine configuration information may be obtained from the memory 32 of the diagnosis module 20 without communicating with remote location 28, or from the remote location 28 through the network 26. The diagnostic module 20 may then repeat steps 220-226 to re-diagnose the engine system 14. As noted above, diagnostic module 20 may fix the engine system 14 by itself or with communication with remote location 28.

At block 230, the manufacturer may repair the engine system 14 based on the diagnostic result. In one embodiment, the manufacturer may send instructions and/or parts based on the diagnostic result for repairing the engine system 14 to the customer and have the customer to repair the engine system 14. In another embodiment, the manufacturer may send an engineer that is skilled in solving the problem diagnosed in step 226 to the customer to repair the engine system 14.

Figure 5:
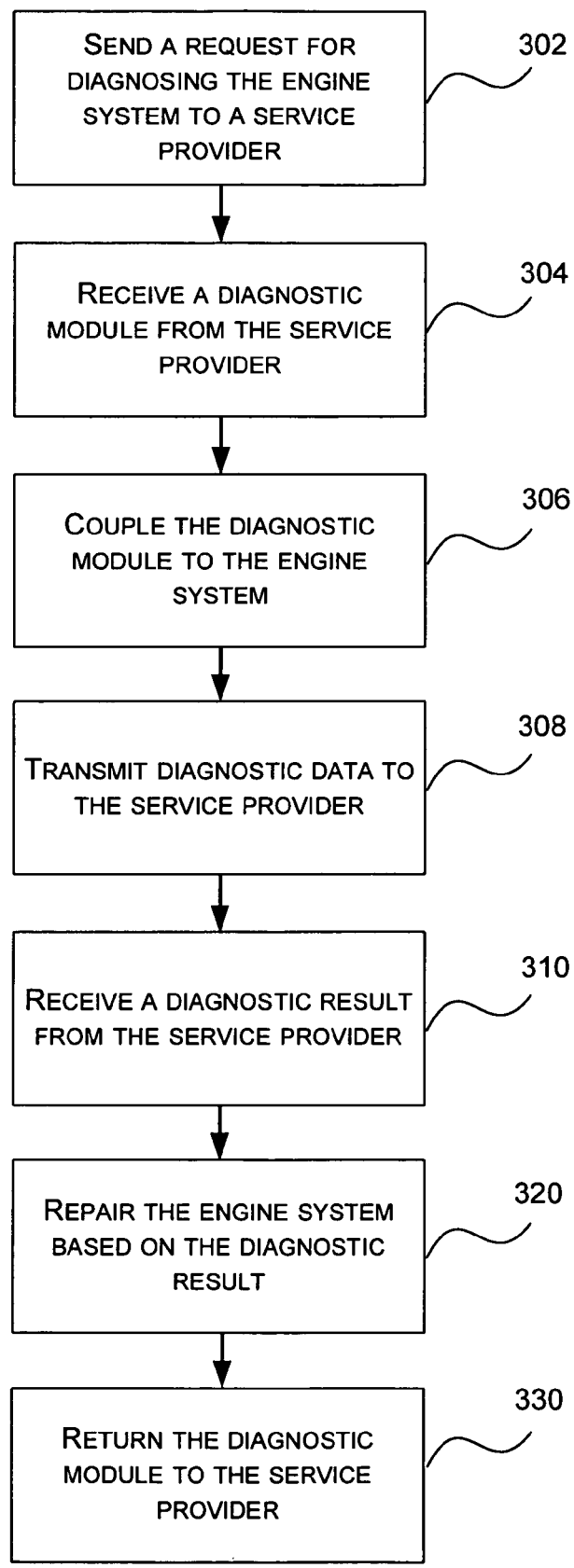
FIG. 5 is a flow chart illustrating a method for diagnosing an engine system according to yet another embodiment of the disclosure.

FIG. 5 illustrates a flow chart of another exemplary diagnostic process for diagnosing the engine system 14 using the diagnostic system 10. At block 302, a user or a customer may send a request for diagnosing the engine system 14 to the service provider (e.g., the manufacturer). At block 304, the customer may receive a diagnostic module 20 from the service provider. The diagnostic module 20 may be received by the customer by mail delivery, or by other means. At block 306, the customer may couple the diagnostic module to the engine system 14. At block 308, the diagnostic module 20 may transmit diagnostic data to the service provider.

At block 310, the customer may receive the diagnostic result from the service provider. At block 320, the customer may repair the engine system based on the diagnostic result of step 310. In one embodiment, the customer may receive instructions based on the diagnostic results of step 310 from the service provider, and repair the engine system 14 based on the instructions. In another embodiment, the customer may receive an engineer that is skilled in solving a problem as diagnosed in step 310 from the service provider to repair the engine system 14. At block 330, the customer may return the diagnostic module 20 to the service provider.

INDUSTRIAL APPLICABILITY

The disclosed diagnostic system 10 may be used for any engine systems or other applications. Such applications may include stationary equipment, such as power generation sets, and mobile equipment, such as vehicles including trucks or automobiles, heavy duty equipments, etc.

The present apparatus and method for diagnosing an engine system 14 using a diagnostic module 20 in combination with a network 26 has utility for a wide variety of machine applications. The diagnostic method of the present disclosure is capable to provide diagnostic services from a remote location 28, such as the engine system manufacturer or the customer service center associated with the manufacturer. The diagnostic method of the present disclosure is also capable to provide real-time diagnostic services. The customer may couple the diagnostic module 20 to the engine system 14, or a low-level skilled engineer with lower cost may be sent to the customer to couple the diagnostic module 20 to the engine system 14. Then the customer may receive instructions and/or parts for fixing the problems as diagnosed by the diagnostic module 20 and/or from the remote location 28, or a relatively high-level skilled engineer specialized in fixing the type of problems diagnosed by the diagnostic module 20 may be sent to the customer to fix the problems. The method of the present disclosure may lower diagnostic costs by saving the travel time and expense for sending an engineer to initially check the engine problems on site. By identifying particular problems of the engine system 14 and then sending a skilled engineer specialized in solving the particular problems only when it is necessary, the disclosed method further improves the efficiency and reduce the cost for both the customer and the manufacturer. Additional reduced cost can be obtained through reuse of the diagnostic module with different customers.

It will be apparent to those skilled in the art that various modifications and variations can be made to the diagnostic method. Other embodiments will be apparent to those skilled in the art from consideration of the specification and practice of the disclosed diagnostic method. It is intended that the specification and examples be considered as exemplary only, with a true scope being indicated by the following claims and their equivalents.

What is claimed is:

1. A method of diagnosing an engine system, comprising:
   receiving a request for diagnosing an engine system;
   delivering a diagnostic module to the requester from a location remote from the engine system;
   having the diagnostic module coupled to the engine system;
   diagnosing the engine system based on information received by the diagnostic module; and
   providing repair assistance based on the diagnosing of the engine system, the providing of repair assistance including transmitting repair instructions to the diagnostic module.

2. The method of claim 1, wherein the diagnosing of the engine system includes transmitting data from the diagnostic module to a location remote from the engine system.

3. The method of claim 2, wherein the repair instructions include instructions to reconfigure an electronic control module of the engine system based on the diagnosing of the engine system.

4. The method of claim 3, wherein the repair instructions includes instructions to reconfigure the electronic control module with engine configuration information stored in a memory of the diagnostic module.

5. The method of claim 1, wherein the providing of repair assistance includes selectively sending an engineer having a particular level of skills to the requestor for repairing the engine system based on a difficulty level of a problem as diagnosed.

6. The method of claim 1, wherein the providing of repair assistance includes sending a part to the requester to repair the engine system.

7. The method of claim 1, further including receiving the diagnostic module back after providing the repair assistance.

8. A method of diagnosing an engine system comprising:
   receiving a request for diagnosing an engine system;
   delivering a diagnostic module to the requestor;
   initiating diagnosis of the engine including
      sensing at least one parameter of the engine system and generating data representing the sensed at least one parameter,
      transmitting the data to the diagnostic module coupled to the engine system,
      transmitting output data from the diagnostic module to a location remote from the engine system through a communication link;
   diagnosing the engine system with the output data from the diagnostic module; and
   changing engine configuration information in an electronic control module of the engine system, the engine configuration information including at least engine fuel map information.

9. The method of claim 8, further including,
   resensing at least one parameter of the engine system and regenerating data representing the resensed at least one parameter;
   transmitting the data to the diagnostic module coupled to the engine system;
   transmitting output data from the diagnostic module to a location remote from the engine system through the network; and
   diagnosing the engine system with the output data from the diagnostic module.

10. The method of claim 9, wherein the changing of the engine configuration information in the electronic control module includes obtaining the engine configuration information from a memory of the diagnostic module, and changing the engine configuration information in the electronic control module with the engine configuration information obtained from the memory.

11. The method of claim 9, wherein the changing of the engine configuration information in the electronic control module includes obtaining the engine configuration information through the network, and changing the engine configuration information in the electronic control module with the engine configuration information received through the network.

12. The method of claim 8 further including, processing the data transmitted to the diagnostic module in a processor of the diagnostic module to generate an initial diagnostic message.

13. The method of claim 8, wherein the diagnostic module is implemented with a CAN calibration protocol.

14. The method of claim 8, wherein the engine fuel map information includes information related to revolutions per minute of the engine and air density.

15. The method of claim 8, wherein changing the engine configuration information includes a user of the engine system instructing the diagnostic module to reconfigure the electronic control module.

16. A method of diagnosing an engine system comprising:
   sending a request for diagnosing an engine system to a service provider;
   receiving a diagnostic module from the service provider the diagnostic module configured to be electronically coupled to the engine system;
   transmitting diagnostic data generated by the diagnostic module to the service provider; and
   receiving repair information from the service provider to the diagnostic module based on the transmitted diagnostic data, the repair information including instructions to reconfigure an electronic control module of the engine system.

17. The method of claim 16, wherein the receiving repair information includes receiving instructions to reconfigure the electronic control module with engine configuration information stored in a memory of the diagnostic module.

18. The method of claim 16, wherein the receiving repair information includes engine configuration information to repair the engine system.

19. The method of claim 16, wherein electronic coupling of the diagnostic module to the engine system includes coupling the diagnostic module to the engine system through a controller area network data bus.

20. The method of claim 16, further including sending the diagnostic module back to the service provider after receiving the repair assistance.

* * * * *